Figure 4:
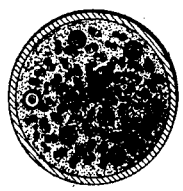

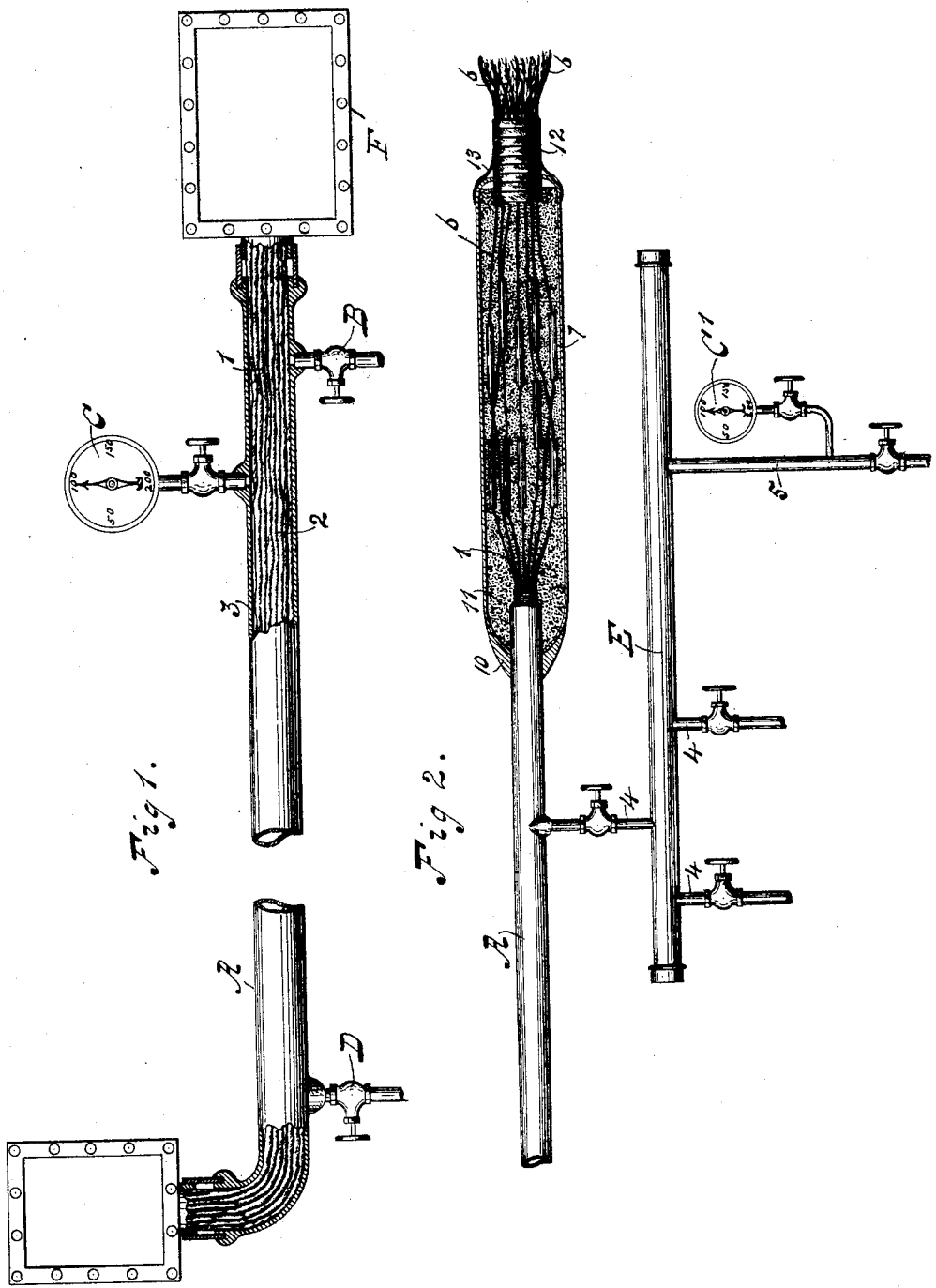

(No Model.) 2 Sheets—Sheet 2.

N. G. WARTH.
ELECTRIC CABLE.

No. 603,069. Patented Apr. 26, 1898.

Witnesses.
Robert Weir
J B Weir

Inventor.
Nathaniel G. Warth,
by Chas. C. Buckley, Atty.

UNITED STATES PATENT OFFICE.

NATHANIEL G. WARTH, OF INDIANAPOLIS, INDIANA.

ELECTRIC CABLE.

SPECIFICATION forming part of Letters Patent No. 603,069, dated April 26, 1898.

Application filed October 25, 1897. Serial No. 656,307. (No model.)

*To all whom it may concern:*

Be it known that I, NATHANIEL G. WARTH, a citizen of the United States, residing at Indianapolis, in the county of Marion and State of Indiana, have invented certain new and useful improvements in cable or like devices and methods of reducing the electrostatic capacity and increasing the insulation resistance and dielectric strength thereof, of which the following is a specification.

My invention relates to electrical devices involving in their construction one or more electrically-insulated conductors or conductor-sections and depending for a high degree of efficiency largely upon the possession by their insulating media or dielectrics of a low specific inductive capacity or a high specific resistance or a high dielectric strength or upon two or all three of these characteristics—such device, for instance, as induction-coils, converters, condensers, telegraph and telephone cables, and the like.

Prominent objects of my invention are to reduce the electrostatic capacity of such devices and increase the specific resistance and dielectric strength of their dielectrics; to allow such results to be attained without the accompaniment of an objectionable variation in size, form, or construction of the device; to arrange for the continuous indication of the condition of the insulating medium or dielectric and also for the instantaneous detection of a change in such condition; to arrange for the leading out of the conductors for service, especially in a telephone or telegraph cable, without impairing the desirable characteristic of the dielectric, and to accomplish the foregoing results in an inexpensive, simple, practical, and highly-efficient manner.

In a device of the class specified characterized by my invention compressed air or like gas is confined for service as a dielectric—that is to say, air or like gas under a pressure greater than the normal atmospheric pressure, or, in other words, under artificial pressure, is so confined and retained within the device as to serve as a dielectric when the latter is in use, in contradistinction to being temporarily employed in the manufacture of the device—as, for example, for the purpose of expanding into shape a solid conductor surrounding a dielectric made temporarily soft and pliable, so as to be easily acted upon by the air under pressure. As a result the device has a dielectric of very low specific inductive capacity and of very high specific insulation resistance and also of very high dielectric resistance, all of which properties, it will be observed, can be procured without objectionably increasing the size or varying the form or construction of the device.

In carrying out my invention I confine the insulated conductors within an impermeable and hermetically-sealed hollow or chambered conductor-holder—such, for example, as a hermetically-sealed tubular metallic sheath or casing of a telephone or telegraph cable—and then force or introduce the air or like gas into the interior of such holder, so that substantially all of the space otherwise unoccupied within the holder becomes filled with air or like gas under artificial pressure of any desired degree. The space between the insulated conductors could be substantially unoccupied by solid or liquid matter or it could contain a greater or less amount thereof. In the former instance the dielectric will be substantially those of compressed air, whereas in the latter instance they will be modified in accordance with the amount and quality of the solid or liquid insulation so employed. As a preferred arrangement such space contains a considerable amount of very soft and dry porous fibrous insulating material—such as cotton, paper, jute, or the like—with many and comparatively large spaces or interstices in which air or the like can be compressed and which at the same time prevents the conductors or conductor-sections from moving out of position within the holder and from coming into contact with one another and with the walls of the holder. Obviously devices of the class specified now in use and involving in their construction such a mass of porous and fibrous insulation—such, for instance, as hygroscopically-insulated electric cables—can have my invention applied to them by making them hermetically tight if they are not already so constructed, and by then forcing air or like gas under artificial pressure thereinto, so as to cause the same to be confined therein for service as a dielectric. By such treatment such devices will have their specific inductive capacity lessened and their insulation and dielectric strength increased.

In this application I show my invention applied to an electric cable, such as a telephone or telegraph cable, involving in its construction a plurality of longitudinally-disposed insulated conductors and an impermeable and hermetically-sealed lead or other metallic pipe, in which the conductors and the insulation therefor are confined. In view of the foregoing, however, it will be seen that I do not consider that my invention is applicable to an electric cable alone, but consider that it is equally applicable to any and all of the devices of the class specified.

The ends of the cable can be hermetically sealed in any suitable manner; but as a preferred arrangement and matter of further improvement they are sealed by a terminal, which is particularly adapted for such purpose, and also for allowing the easy and quick connecting up of the ends of the cable-conductors for service.

Figure 5:
Figure 6:
Figure 3:
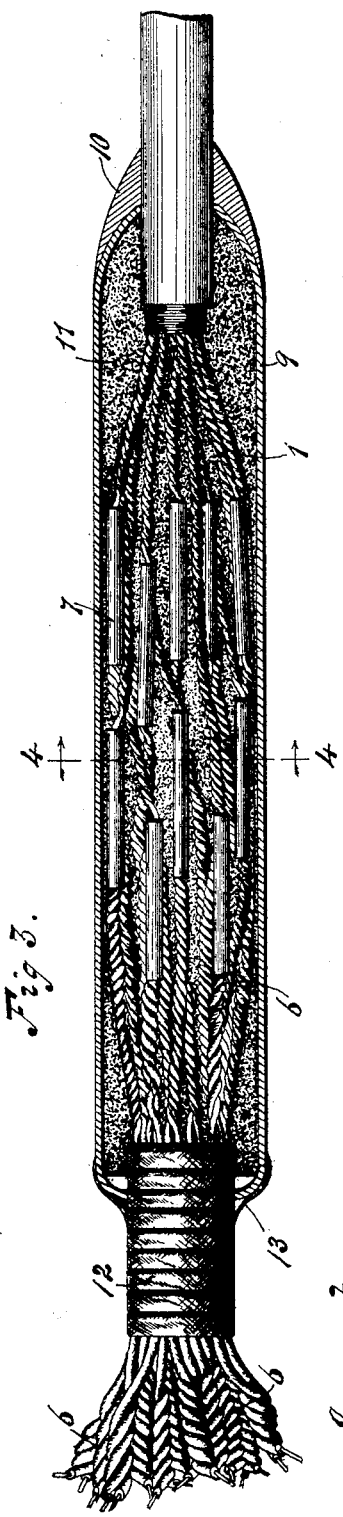

In the accompanying drawings, Figure 1 is a view, partly in elevation and partly in section, of the end section of a cable embodying my invention and having its ends terminated in and hermetically sealed by the ordinary cable-boxes. Fig. 2 is a view, also partly in elevation and partly in section, of one of the ends of such a cable and my improved hermetically-sealing terminal therefor. Fig. 3 is a longitudinal section of one of the cable ends and such improved terminal on a larger scale. Fig. 4 is a transverse section of the same, taken on line 4 4 in Fig. 3; and Figs. 5 and 6 are views of details of construction employed in making such terminal.

The cable A, which I have shown in the drawings to illustrate my invention, comprises a plurality of longitudinally-disposed conductors 1, such as copper wires, a mass 2 of hygroscopic insulation, in which the conductors 1 are so embedded as to insulate them from one another, and an exterior impermeable metallic, preferably lead, sheath or casing 3, which incloses and protects the core formed by the conductors 1 and insulation 2 and maintains the permanency of the latter by excluding moisture from it. This insulation 2 of the cable-core could be paper, jute, cotton, or like hygroscopic material, most or all of which are of a fibrous structure, and, if desired, it could be treated with any well-known insulating compound or oil to increase its insulating capacity; but inasmuch as such treatment results in an objectionable increase in the electrostatic capacity of the cable when it is put into service the insulation 2 is preferably left in a dry or untreated condition. It is further advantageous to leave it in such a dry condition in applying my invention for the reason that its porosity is not lessened by the absorption of such compound or oil, and hence it can receive in its pores and interstices a maximum quantity of air or like gas.

As a simple and convenient way of causing compressed air or the like to become confined within the cable for service as a dielectric therein such gas is forced or introduced into the interior of the cable by way of a suitable valved inlet-pipe B, attached to the sheath 3 by means of an air or like pump connected to the inlet-pipe B until the pressure of the gas within the cable-sheath has reached the desired degree. The valve of the inlet-pipe B can then be closed and the pump disconnected.

A short length of the inlet-pipe B is desirably attached permanently to the cable-sheath, whereby more air or like gas can be introduced into the cable-sheath from time to time in case any of it escapes therefrom.

In order to determine the pressure of the gas within the cable, the sheath 3 is provided with a pressure-gage C, Fig. 1, which can be attached thereto at any convenient point. This pressure-gage C could be detachably secured to the cable and could be removed therefrom in such a way as not to allow the escape of the gas after a sufficient quantity thereof has been introduced into the sheath and before the cable is put into service; but as a preferred arrangement it is attached permanently to the sheath and is allowed to remain thereon while the cable is in use. In this way its indication of the pressure of the gas within the cable will continuously indicate whether the cable-sheath and its sealed ends are still impermeable or whether they or either of them have become permeable.

After the cable has been erected or laid and its ends have been sealed and connected up for service the moisture which its insulation has absorbed during such installation or in other ways can be removed by forcing any dry gas, preferably in a heated condition, into the cable-sheath by way of the inlet-pipe B and allowing the same to escape from a suitable outlet, such as a valved outlet-pipe D, at the outer end of the cable until the insulation is thoroughly dried. The valve of the outlet-pipe D can then be closed and the insulating-gas introduced within the interior of the cable-sheath by the pipe B, as before. The simplest way of thus drying out the cable insulation of the cable and of causing an insulating-gas under pressure to become a dielectric for service therein is to force dry and preferably heated air into, through, and out of the sheath by way of the inlet and outlet pipes B and D by means of a suitable air-pump connected to the former until the moisture has been removed from its interior, and by then closing the outlet-valve D and continuing the introduction of air by way of the inlet-valve B until the desired degree of pressure has been attained within the cable.

If desired, the pump for forcing the drying and insulating gases into the cable can be connected therewith through the medium of a pipe E, as shown in Fig. 2, which pipe E can be provided with a plurality of branches 4, adapted for connection with the inletvalves of a plurality of cables, whereby a plurality of cables can be simultaneously dried out or charged with the gas under pressure. In such cases a pressure-gage C' can be attached to the pipe 5, leading to the pump, whereby the same pressure of the insulating-gas may be secured in all of the cables.

The ends of the cables can be hermetically sealed, so as to permit connection to the conductor thereof, and also to prevent the escape of the compressed insulating-gas and the access of moisture to the cable insulation in any suitable or desired manner. For example, they can be terminated in the ordinary hermetically-tight cable-boxes F, as shown in Fig. 1. However, as a preferred arrangement and as a matter of further improvement the protruding ends of the cable-conductors 1 1 are electrically connected to the ends of a plurality of non-hygroscopically and preferably flexible insulated conductors 6 6, as best shown in Figs. 3 to 6, inclusive, and the connections 7 7 between the conductors 1 1 and 6 6, the protruding ends of the cable conductors 1 1, and preferably a slight extent of the cable end are confined in an impermeable covering. In this way not only will the escape of the compressed air or like gas from within the cable-sheath be effectively and permanently prevented, but also the ends of the cable-conductor can be easily connected up for service. The ends of the cable will be flexible and movable in contradistinction to the inflexible and immovable terminals provided by the commonly-employed cable-boxes, and, furthermore, the necessity of employing such undesirable boxes is entirely obviated, and the cable is provided with a terminal which is sightly, durable, and easily and inexpensively constructed. It is obvious that such a terminal can also be employed in connection with cables not interiorly charged with a compressed insulating-gas, and when so employed will advantageously serve to prevent the access of moisture to the insulation of the cable-core, in addition to providing the other advantages mentioned as incidental to its use in connection with charged cables.

The plurality of non-hygroscopically-insulated conductors 6 6 can of course be those of a cable whose fabric insulation is of non-hygroscopic material, such as the rubber insulating compounds, or they can be a plurality of independent non-hygroscopically-insulated conductors or spider-wires, as shown in the drawings. The connections between the ends of these non-hygroscopically-insulated conductors 6 6 and the ends of the cable-conductors 1 1 are desirably formed and insulated by twisting together the bared wire ends, then doubling the twisted portion thus formed back upon the adjacent portion of one or the other of the conductors, as shown in Fig. 5, and finally wrapping an insulating-sleeve 8 securely about the doubled-back twisted-wire ends and the adjacent portion of both conductors, as best shown in Fig. 6. The joints or connections thus formed are desirably not bunched together in a short longitudinal space, but are distributed through an extended longitudinal space, so as to prevent a material thickening of the cable, as shown in Figs. 2 and 3.

As an effective and practical way of confining the cable end, the protruding ends of the cable-conductors 1 1, and the conductor-joints 7 7 in an impermeable covering, first a metallic, preferably lead, sleeve or tube 9 is arranged about the same. Next an air-tight joint, such as the wiped joint 10, is formed between the end of the cable-sheath and the sleeve end which immediately covers such cable-sheath end. Then the interior of the sleeve or thimble 9 is substantially filled with a sealing material 11, such as beeswax or asphaltum compound, from the end of such sleeve opposite its cable-inclosing end, the sleeve being desirably preliminarily heated for such operation and the sealing material being introduced therein in a molten condition and subsequently allowed to cool and harden, and finally closing the end of the sleeve 9, from which the conductors 6 6 extend, about the latter at a point where they are assembled into a compact core. The sleeve or thimble 9 could be longitudinally extended from the cable end sufficiently far to cause the sealing compound when substantially filling it to embed only the protruding ends of the cable-conductors and the joints formed between such protruding ends and the ends of the non-hygroscopically-insulated conductors; but as a preferred arrangement it is extended to an extent to cause the embedment of a small portion of such non-hygroscopically-insulated conductors also, as shown in the drawings, whereby absolute immunity from the access of moisture to the joints or cable insulation is secured.

Where the conductors 6 6 are those of a non-hygroscopically-insulated cable, the end of the sleeve 9 immediately surrounding such cable can be closed about it without any preparation or alteration of the same; but where such conductors are independent, as shown in the drawings, they are conveniently formed into a compact core for inclosure by the end of the sleeve 9 by wrapping them with several windings of insulating-tape 12. In either case the sleeve end immediately inclosing the core including such conductors can easily be closed about them by bending in or dressing down its edge, as best shown in Fig. 3, until the same impinges against such core and by then wrapping it with one or more layers 13 of tape or the like.

In case the non-hygroscopically-insulated conductors are independently-insulated wires and the latter are made into a compact core by winding them with tape 12 the layers of such tape are desirably extended thereupon a small distance beyond the end of the metal sleeve 9. In this way the non-hygroscopically-insulated wires, if they break as a result of handling, for instance, will not break at the end of the sleeve, as they would do if they were continually bent about the same, but will break at a point outside of the sleeve, so that there will protrude from the latter a stub or end which can be connected with a substitute or connecting conductor without opening or interfering with the cable-terminal. This terminal I find can be easily, quickly, and economically made and proves to be exceedingly durable and satisfactory. After it is made the conductors 6 6 can be led to and connected with any desirable apparatus and, being non-hygroscopically insulated, do not when so connected absorb moisture and thereby lower the insulation capacity or increase the electrostatic capacity of the line.

Having thus described my invention, what I claim as new therein, and desire to secure by Letters Patent, is—

1. A device of the class specified containing compressed insulating-gas confined for service as a dielectric.

2. A device of the class specified comprising one or more separated conductors or conductor-sections, and an impermeable and hermetically-sealed conductor-holder which incloses the conductors or conductor-sections, and contains compressed air or like gas confined for service as a dielectric.

3. A device of the class specified having its dielectric composed in part of fabric or like solid insulating material, and in part of compressed insulating-gas confined for service as a dielectric.

4. An electric cable comprising an impermeable metallic sheath hermetically sealed for service; a plurality of conductors disposed longitudinally therein; a mass of dry, fibrous hygroscopic insulation in which the conductors are embedded; and compressed air or like gas which occupies the interstices of the insulation, and the space or spaces between the insulation and the conductors and the walls of the sheath, and so forms in part the dielectric of the cable when the latter is in use; substantially as set forth.

5. The combination with an electric cable involving in its construction a plurality of longitudinally-disposed conductors, a mass of hygroscopic insulation in which said conductors are embedded, and an impermeable sheath which incloses the core formed by the conductors and insulation; of a plurality of non-hygroscopically-insulated conductors having their ends electrically connected to the protruding ends of the cable-conductors; and an impermeable covering which hermetically incloses the protruding ends of the cable-conductors, and the joints formed between such conductors and the non-hygroscopically-insulated conductors, substantially as set forth.

6. The combination with an electric cable involving in its construction a plurality of conductors, a mass of hygroscopic insulation in which the conductors are embedded, and a metallic sheath which incloses the core formed by the conductors and insulation; of a plurality of non-hygroscopically-insulated conductors having their ends electrically connected to the protruding ends of the cable-conductors; a metallic sleeve which incloses the cable end, the protruding ends of the cable-conductors, and the joints between such protruding conductor ends and the non-hygroscopically-insulated conductors, and which has a hermetically-tight joint with the end portion of the metallic cable-sheath, and is closed about the non-hygroscopically-insulated conductors at a point where the latter are assembled to form a compact core; and a mass of sealing material which occupies the interior of the metallic sleeve and embeds in itself the cable-sheath end, the protruding ends of the cable-conductors, and the joints between such protruding conductor ends and the ends of the non-hygroscopically-insulated conductors, substantially as described.

7. The combination with an electric cable involving in its construction an impermeable sheath or casing, and a plurality of conductors disposed longitudinally in the sheath or casing and insulated therefrom and from one another; of a plurality of non-hygroscopically-insulated conductors connected with the cable-conductor ends which protrude from the end of the cable-sheath; and means for hermetically inclosing the protruding ends of the cable-conductors, and the joints formed between such conductors and the non-hygroscopically-insulated conductors, as set forth.

8. The combination with an electric cable involving in its construction an impermeable sheath and a plurality of suitably-insulated conductors disposed therein; of a plurality of independently and non-hygroscopically insulated conductors connected with the cable-conductor ends which protrude from the cable-sheath; an impermeable incasement which hermetically incloses the protruding ends of the cable-conductors and the joints between the same and the independently and non-hygroscopically insulated conductors; and a number of layers of tape or the like wound about the independently-insulated conductors so as to form the same into a compact core at the end of the impermeable incasement, and extended outward beyond the end of such incasement, substantially as, and for the purpose set forth.

9. The combination with an electric cable, of a plurality of non-hygroscopically-insulated conductors connected with the cable-conductors by joints which are arranged out of line or register, transversely, with one another; a metallic sleeve inclosing the ends of the cable-conductors and the joints between the same and the non-hygroscopically-insulated conductors; and a mass of sealing material confined to the interior of the metallic sleeve; substantially as described.

10. The combination of a device of the class specified containing air or like gas at a pressure other than the normal atmospheric pressure confined for service as a dielectric and a pressure-indicator attached to the device so as to indicate the pressure of the gas contained therein: whereby the condition of the dielectric can be continuously indicated while the device is in use, as set forth.

11. The method of increasing insulation resistance and dielectric strength of electrical devices, which consists in hermetically incasing the conductors thereof for service; and compressing air or like gas thereinto for service as a dielectric.

12. The method of decreasing the electrostatic capacity and increasing the insulation resistance and dielectric strength of electrical devices involving in their construction a mass of porous insulating material, which consists in hermetically incasing the conductors and porous insulating material thereof for service; and compressing air or like gas into the interstices of the insulation for service as a dielectric.

In testimony whereof I hereunto set my hand this 23d day of September, 1897.

NATHANIEL G. WARTH.

In presence of—
L. M. BULKLEY,
A. M. BELFIELD.